United States Patent [19]

Hanlet

[11] Patent Number: 4,503,362
[45] Date of Patent: Mar. 5, 1985

[54] FREQUENCY STABILIZED, GAIN CONTROLLED BALLAST SYSTEM

[75] Inventor: Jacques M. Hanlet, Loxahatchee, Fla.

[73] Assignee: Intent Patent A.G., Liechtenstein

[21] Appl. No.: 500,147

[22] Filed: Jun. 1, 1983

[51] Int. Cl.³ .............................. H05B 37/02
[52] U.S. Cl. ............................ 315/221; 315/95; 315/105; 315/177; 315/185 R; 315/205; 315/206; 315/210; 315/224; 315/290
[58] Field of Search ............ 315/95, 105, 177, 185 R, 315/205, 206, 210, 221, 224, 290, DIG. 2

[56] References Cited

U.S. PATENT DOCUMENTS

| | | | |
|---|---|---|---|
| 3,753,071 | 8/1973 | Engel et al. | 363/39 |
| 4,045,711 | 8/1977 | Pitel | 315/209 R |
| 4,127,795 | 11/1978 | Knoll | 315/210 |
| 4,127,798 | 11/1978 | Anderson | 315/209 R |

*Primary Examiner*—Harold Dixon
*Attorney, Agent, or Firm*—Morton J. Rosenberg

[57] ABSTRACT

A frequency stabilized automatic gain controlled ballast system (10) which is coupled to a power source (12) in order to operate at least one of a pair of gas discharge tubes (40 and 40'). Each of the gas discharge tubes (40, 40') include respective filaments (42, 44 and 42', 44'). A frequency control circuit (11) is coupled to the power source (12) and includes a frequency control transformer (43) and a frequency control capacitor (50) for establishing a constant oscillation signal at a predetermined frequency. A switching network (13) is connected to the frequency control circuit (11) for establishing a pulsating current responsive to the constant oscillation signal of predetermined frequency. Induction circuitry (15) is coupled to the switching network (13) and the frequency control circuit (11) and includes an inverter transformer (78) as well as coupling capacitors (86 and 88) for generating a voltage across the gas discharge tubes (40 and 40'). Automatic gain control circuitry (17) is included in inverter transformer (78) and is made up of a pair of secondary windings (80 and 81) wound in a manner to provide a negative feedback voltage to each of the transistors (70 and 70') of switching network (13). The inverter transformer (78) has a pair of primary windings (82 and 84) which operate alternately and are coupled to the primary winding (45) of frequency control transformer (43) to provide a repetitive cycle. First and second coupling capacitors (86 and 88) are coupled to primary windings (82 and 84) of inverter transformer (78) and filaments (42 and 42') of gas discharge tubes (40 and 40') for discharging the induced voltage across the tubes (40 and 40').

26 Claims, 1 Drawing Figure

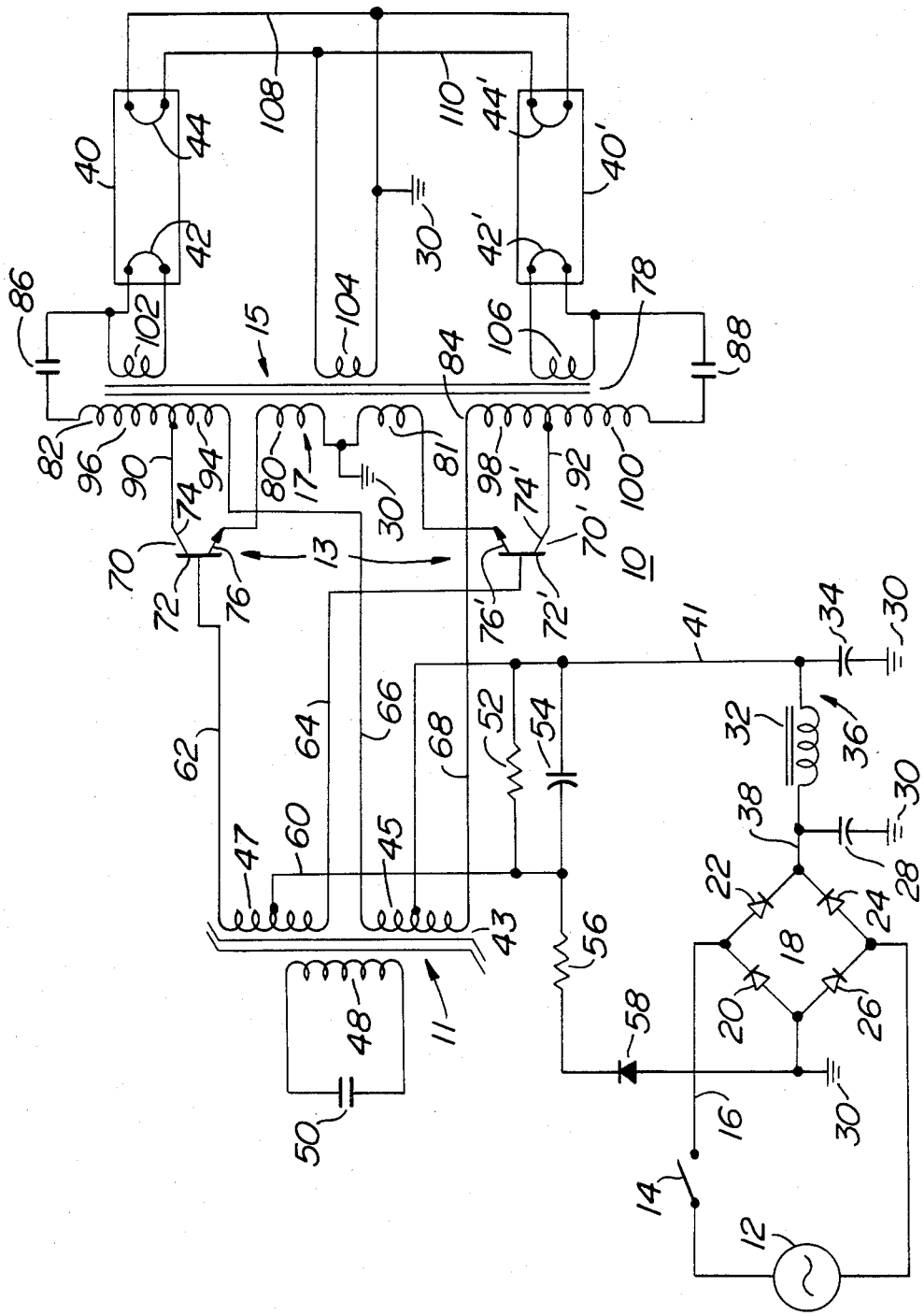

FREQUENCY STABILIZED, GAIN CONTROLLED BALLAST SYSTEM

BACKGROUND OF THE INVENTION

1. Field of the Invention

This invention relates to electronic ballast systems for gas discharge tubes. In particular, this invention pertains to electronic ballast systems for fluorescent type gas discharge tubes. In particular, this invention relates to an electronic ballast system which is frequency stabilized. More in particular, this invention pertains to an electronic ballast system which has an automatic gain control circuit. Still further, this invention relates to an electronic ballast system which provides for a frequency stabilized automatic gain controlled network and provides for a minimization of electrical components in combination.

2. Prior Art

Electronic ballast systems for gas discharge tubes and for fluorescent tubes in particular are known in the art. Additionally, ballast systems for a plurality of fluorescent discharge tubes is also known in the art.

However, in many prior art ballast systems, the gain of included switching circuits must be adjusted or matched which results in the addition of components such as potentiometers or additional electronic circuits to maintain substantially equal outputs of component power transistors irrespective of their individual current gain. Addition of such elements add to the overall volume and cost of such prior art ballast systems.

Additionally, in many prior art ballast systems which operate at more than double the line frequency, the operating frequency is not constant and varies with supply voltage or load current, or possibly with both. Such prior art systems due to this frequency variability may cause a flicker effect when one of a multiplicity of fluorescent lamps is electrically removed from the overall circuit. In some cases, where one of the fluorescent lamps is removed from the circuit, a second fluorescent tube may be entirely extinguished.

Many such prior art systems use the commonly known Jensen Circuit (I.R.E. Transactions on Circuit Theory, September 1957, James Lee Jensen) where the frequency of oscillation generated by a saturable transformer is dependent upon the magnitude of the voltage feedback from a non-saturating power transformer through a series resistor. This type of system operates in such a way that one transistor is in an "on" state with its collector approximately at the potential of the emitter, and the other transistor is in an "off" state with its collector at approximately twice the supply voltage. Thus, the voltage applied to the saturating transformer will be equal to twice the supply voltage minus the drop across the series resistor. As this transformer goes into saturation, the current through the series resistor will increase, thereby increasing the voltage drop across the resistor and having the effect of decreasing the power supplied to the saturating transformer and decreasing the loop gain as well. This sequence of events causes the transistors to change state. The base drive of the "on" transistor becomes insufficient for it to remain in conduction and induced voltages will decrease. Voltages of opposite polarity appear and the base drive of the previously "off" transistor will increase turning it to an "on" state and re-establishing the sequence of events to make a recurring cycle. Hence, it can be seen that this type of prior art system has an operating frequency dependent on when the saturating transformer goes into saturation and such varies with supply voltage or changes in the load which effect the feedback voltage.

Additionally, in such prior art ballast systems, the shift in frequency caused by the change in load current when a fluorescent lamp is electrically removed from the circuit may cause high voltage surges which are destructive to such systems. Thus, in such prior art systems, there must be incorporated additional electrical components to prevent damage to such prior art circuits. The addition of electrical components in these prior art systems increases the volume required by such systems and further increases the heat dissipation of the prior art ballasts.

SUMMARY OF THE INVENTION

A frequency stabilized, gain controlled ballast system having a power source for actuating at least one gas discharge tube including a frequency controlled circuit connected to the power source for establishing a substantially constant oscillation signal of predetermined frequency. The ballast system includes a switching network coupled to the frequency control circuit for establishing a pulsating current responsive to the substantially constant oscillation signal at the predetermined frequency. An induction circuit is coupled to the frequency control circuit and the switching network for generating a voltage across the gas discharge tube responsive to the pulsating current established by the switching network. The induction circuit includes automatic gain control circuitry for maintaining a gain value of the switching network to a predetermined level.

BRIEF DESCRIPTION OF THE DRAWINGS

The FIGURE is an electrical schematic diagram of the frequency stabilized automatic gain controlled ballast system.

DESCRIPTION OF THE PREFERRED EMBODIMENTS

Referring now to the FIGURE, there is shown frequency stabilized automatic gain controlled ballast system 10 having power source 12 for actuation of at least one of a pair of gas discharge tubes 40 and 40'. Gas discharge tubes 40 and 40' may be standard fluorescent type systems having first and second filaments 42, 44 and 42', 44', respectively.

In overall concept, frequency stabilized automatic gain controlled electronic ballast system or ballast system 10 is provided for maximization of the efficiency of light output from gas discharge tubes 40 and 40' with respect to power input from power source 12. Further, frequency stabilized ballast system 10 provides for a concatenation of elements directed to the minimization of electrical components for efficiently activating gas discharge tubes 40 and 40'. Reduction of the electronic components results in lower labor costs providing a generally low overall manufacturing cost outlay for ballast system 10. As will be described in following paragraphs, ballast system 10 provides for an automatic gain control, which eliminates need for the matching of the gain of transistor components within system 10.

Additionally, and as will be described in following paragraphs, ballast system 10 provides for a frequency control mechanism which allows for frequency stabilization having the advantage of allowing system 10 to operate in a normal manner without bothersome flicker when either of gas discharge tubes 40 or 40' is electrically deleted from system 10.

Particularly, operational costs for operational gas discharge tubes 40 and 40' are maintained at a minimal level due to the higher efficiencies attained by frequency stabilized automatic gain controlled electronic ballast system 10. Of importance to the reliability of system 10 is the minimization of electrical components coupled with the simplicity of the circuitry associated with ballast system 10. This has the effect of increasing the reliability of ballast system 10 and maximizing the operating lifetime of gas discharge tubes 40 and 40'.

Referring now to the FIGURE, electronic ballast system 10 having power source 12 for actuating at least one of gas discharge tubes 40 or 40' includes frequency control circuit 11 coupled to power source 12 for establishing a substantially constant oscillation signal of predetermined frequency. In still further overall concept, ballast system 10 includes switching network 13 which is electrically connected to frequency control circuit 11 for establishing a pulsating current responsive to the substantially constant oscillation signal emitted at the predetermined frequency. Induction circuitry 15 is coupled to both frequency control circuit 11 and switching network 13 in order to generate a predetermined voltage across gas discharge tubes 40 and 40' responsive to the pulsating current established by switching network 13. As will be detailed in following paragraphs, induction circuitry 15 includes automatic gain control circuitry 17 for maintaining a gain value of switching network 13 to a predetermined level.

Referring further to the FIGURE, there is shown power source 12 to provide electrical power for frequency stabilized automatic gain control electronic ballast system 10. In the embodiment shown in the FIGURE, power source 12 is seen to be an AC source of a standard voltage such as 120, 240, or 270 volts, or any acceptable standardized AC power supply voltage. In general concept, power source 12 may be a DC power electrical source applied internal or external system 10 in a manner well-known in the art by removal of bridge circuitry and filtering elements to be described in following paragraphs. For purposes of illustration, power source 12 will in following paragraphs, be designated an AC power source for the embodiment to be described.

Power for system 10 is supplied by power source 12 through switch 14 which may be a standardized switch element such as a single pole, single throw switch mechanism.

Power is input through power line 16 to rectification circuit 18 which is used for providing full wave rectification of the power source AC voltage. Rectification circuit 18 may be a full wave bridge circuit well-known and standard in the art. Full wave bridge circuit 18 may be formed by diode elements 20, 22, 24 and 26 for providing the necessary rectification of AC voltage from power source 12. Diode elements 20, 22, 24 and 26 may be one of a number of standard diode elements and in one form of ballast system 10, diode elements 20, 22, 24 and 26 have a standardized designation of 1N4005.

Rectification or full wave bridge circuit 18 provides a pulsating DC voltage signal passing on output line 38 which is applied to filter network 36. Filter network 36 filters the pulsating DC voltage passing from rectification circuit 18 and is electrically coupled to bridge circuit 18 by output line 38. In overall concept to be further described in following paragraphs, filter circuit or network 36 averages out the pulsating DC voltage signal to provide a substantially continuous smoothed signal for system 10. Rectification or bridge circuit 18 is coupled to ground 30 to be the return path for the DC supply, with the opposing end of bridge circuit 18 providing DC power input to filter network 36.

Filter network 36 includes choke element 32 coupled in series relation to rectification circuit 18 and a pair of filter capacitors 28 and 34 coupled to opposing ends of choke element 32. First filter capacitor 28 is electrically connected on one end to output line 38 and choke element 32 and on an opposing end to ground 30, as is shown in the FIGURE. As can be seen, choke element 32 is coupled in series relation with full wave bridge circuit 18 and power input line 41. Choke element 32 is further coupled on one end to first filter capacitor 28 and output line 38, and on an opposing end to second filter capacitor 34. Second filter capacitor 34 is connected to choke element 32 and power input line 41, as well as ground 30. In combination, second filter capacitor 34 with choke element 32 functions to average out the 120 hz pulsating DC voltage supplied by full wave bridge circuit 18. Additionally, this combination maintains the current drawn by system 10 at an average value without creating a power factor which is either unacceptably leading or unacceptably lagging. Disadvantageous lead or lag may be found wherein a large inductance were used or a large capacitance as the sole filtering means for smoothing the pulsating DC voltage.

For purposes of illustration, if choke element 32 were not incorporated within system 10, second filter capacitor 34 would draw an increased current commonly referred to as a surge current on each cycle as capacitor 34 began to charge. By incorporation of choke element 32, the inductance stores energy during each cycle to supply current for initial charging of second filter capacitor 34 which provides a smooth average current as seen by power source 12.

In the embodiment herein provided, the values of first filter capacitor 28 and choke element 32 have been selected such that the combination of elements 28 and 32 are tuned for 360 hz and form a third harmonic filter for a 120 hz pulsating DC voltage supplied by full wave bridge circuit 18. In a specific operating system, first filter capacitor 28 may be a 250 volt non-polarized 2.0 microfarad capacitor. Additionally, choke element 32 may be an inductor of approximately 97.0 millihenrys. Second filter capacitor 34 is a commercially available 100.0 microfarad, 250.0 volt capacitor.

The current signal passing through power input line 41 is inserted to bias resistor 52 as well as bias capacitor 54 which are coupled in parallel relation each with respect to the other. Bias resistor 52 and bias capacitor 54 are electrically coupled to center tap line 60 of oscillation control transformer 43 of frequency control circuit 11. Oscillation control transformer 43, as is seen, includes primary winding 45 and a pair of secondary windings 47 and 48 coupled to power source 12 and induction circuitry 15. As can be seen, oscillation control transformer primary winding 45 is center tapped by power input line 41. Secondary winding 47 of oscillation control transformer 43 is center tapped by center tap line 60. Oscillation control transformer 43 is thus coupled to power source 12 and has center tap primary winding 45, as well as a pair of secondary windings 47 and 48 where secondary winding 47 is also center tapped by center tap line 60. The center tap provided by center tap line 60 to second secondary winding 47 establishes the oscillation signal of opposing polarity when taken with respect to the center tap.

Bias resistor 52 and bias capacitor 54 establish a bias voltage to initiate the oscillation when system 10 is initially energized. In one operating system, bias resistor 52 may have a value approximating $470 \times 10^3$ ohms and bias capacitor 54 may approximate 1.0 microfarads.

Current limiting resistor 56 and blocking diode 58 in series combination is connected to center tap line 60. Although not important to the inventive concept as herein described, current limiting resistor 56 may have a value approximating 15.0 ohms with a dissipation rating of approximately 0.5 watts. Blocking diode 58 may be a commercially available element having a common designation 1N125 which is connected on a first end to current limiting resistor 56 and on an opposing second end to ground 30.

The series combination of current limiting resistor 56 and blocking diode element 58 provides for a return to ground for the oscillation signal generated in second oscillation control transformer secondary winding 47 once system 10 has gone into an oscillation phase. As can be clearly seen, the bias circuitry for secondary winding 47 includes bias resistor 52, as well as bias capacitor 54 coupled in parallel relation each with respect to the other. The combination is coupled in series relation to the center tap of second oscillation control transformer secondary winding 47 through center tap line 60 and initiates the overall oscillation signal.

In essence, the previously described combination provides for the initiation of the operation of ballast system 10 when switch 14 is placed in a closed position. Additionally, current limiting resistor 56 is coupled to center tap line 60 and to blocking diode 58 in series relationship to provide the return path for the oscillating signal once system 10 has begun to oscillate.

Frequency control circuit 11 including oscillation control transformer 43 further includes oscillation control capacitor 50 coupled in parallel relation to first secondary winding 48. For illustrative purposes only, oscillation control capacitor 50 may have a value approximating 0.001 microfarads.

The value of oscillation control capacitor 50 and the inductance provided by first secondary winding 48 establishes a predetermined frequency value for the oscillation signal. The parallel combination of the inductance of the first secondary winding 48 of oscillation control transformer 43 with oscillation control capacitor forms a resonant circuit for creating a stable frequency of oscillation for system 10. The inductance of first secondary winding 48 is determined by the number of turns in the winding and the characteristics of the core material about which such is wound. Since the frequency of oscillation is determined by elements 48 and 50, it is clearly seen that the frequency is thus independent of the voltage at which system 10 operates, as well as independent of the current drawn by the load. Hence, system 10 operates at a stable frequency predetermined by the component values of circuit elements 48 and 50 and is independent of variations which may occur elsewhere in system 10, in the load, or in an external power distribution system.

In one operating embodiment, oscillation control transformer primary winding 45 may be a winding of 7.0 turns of number 26 wire, which is center tapped by power input line 41 with 3.5 turns on each side of the tap. Second oscillation control transformer secondary winding 47 may be a winding of 5.0 turns of number 26 wire which is center tapped by center tap line 60, such that there are 2.5 turns on each side of the center tap. First secondary winding 48 may be a winding of 150.0 turns of number 28 wire and oscillation control transformer 43 has been successfully operated when such is a ferrite core transformer which is operable in a saturation mode during activation of gas discharge tubes 40 and 40'.

Electronic ballast system 10 includes switching network 13 having a pair of transistors 70 and 70' coupled in feedback relation to oscillation control transformer 43. This allows switching a current signal responsive to the oscillation signal produced. Referring to secondary winding 47 of oscillation control transformer 43, current entering on center tap line 60 is divided and flows through both first transistor line 62 and second transistor line 64. First and second transistors 70 and 70' include respectively bases 72, 72', emitters 76, 76', and collectors 74, 74'. First and second transistors 70 and 70' may be of the NPN type, which are commercially available and have a designation MJE13005.

Current on first and second transistor lines 62 and 64 flow respectively to base elements 72 and 72' of first and second transistors 70 and 70'. One of first and second transistors 70 and 70' will undoubtedly have a slightly higher gain than the other, and will be turned "on" to the conducting state first. When either of first or second transistors 70 or 70' becomes conducting, such holds the other transistor in a non-conducting state for the time interval during which one of the transistors 70 or 70' is in the conducting or "on" state.

Assuming for the purposes of illustration that second transistor 70' goes into the conducting state, the voltage level of second transistor collector 74' is then brought into the neighborhood of second transistor emitter element 76' within approximately 1.0 volts. As is seen in the circuit FIGURE, emitter element 76' is electrically coupled to inverter transformer gain control secondary winding 81 which is itself coupled to ground 30. Thus, the current path for the base drive current is completed. Emitter element 76 of first transistor 70 is coupled to inverter transformer gain control secondary winding 80 which is, as in the case of secondary winding 81, coupled to ground 30.

Induction circuitry 15 includes inverter transformer 78 electrically coupled to switching network 13 as previously described. Additionally, inverter transformer 78 is further connected to frequency control circuit 11 with inverter transformer 78 having a tapped pair of primary windings 82 and 84 as well as a multiplicity of secondary windings 102, 104, 106, and inverter transformer gain control secondary windings 80 and 81. Induction circuit 15 further includes a pair of coupling capacitors 86 and 88 which are connected in series relation to respective primary windings 82 and 84, as well as gas discharge tubes 40 and 40'.

Thus, inverter transformer 78 includes first inverter transformer primary winding 82 and second inverter transformer primary winding 84, with one side of each of primary windings 82 and 84 being coupled to opposing ends of oscillation control transformer primary winding 45 through lines 66 and 68, respectively.

As will be described, primary windings 82 and 84 of inverter transformer 78 are tapped in a manner to provide an auto-transformer configuration. In particular, first inverter transformer primary winding 82 is tapped by transistor tap line 90 which electrically connects a portion of first inverter transformer primary winding 82 to collector 74 of first transistor 70. Thus, oscillation control transformer primary winding 45 is coupled through line 66 to first section 94 of first inverter transformer primary winding 82 to tap line 90 which is then coupled to first transistor collector 74. In like manner, an opposing end of oscillation control transformer primary winding 45 is coupled through line 68 to first section 98 of second inverter transformer primary winding 84, which is then coupled to second transistor tap line 92 connected to second transistor collector 74'.

Unlike some prior art systems, where the saturating transformer is driven by the magnitude of a feedback voltage, the subject electronic ballast system 10 is current driven. During one-half cycle, the collector current of first transistor 70 is in a feedback mode with oscillation control transformer primary winding 45 since it flows from power input line 41 through one-half of oscillation control transformer primary winding 45 being then coupled by line 66 to first section 94 of first inverter transformer primary winding 82 where it then flows through first transistor tap line 90 into collector 74 of first transistor 70.

Likewise, during alternate half cycles collector current of second transistor 70' is in a feedback mode to oscillation control transformer primary winding 45 since collector current flows from power input line 41 through oscillation control transformer primary winding 45 and coupling line 68 to first section 98 of second inverter transformer primary winding 84 and to second transistor tap line 92, then flowing into collector 74' of second transistor 70'.

The collector current which flows through oscillation control transformer primary winding 45 during each half cycle generates the magnetic flux which saturates the core of oscillation control transformer 43. The maximum current which can flow through primary winding 45 is determined by the applied voltage divided by the sum of the impedance of one-half the primary winding 45, the impedance of first section of first inverter transformer primary winding 94 or first section of second inverter transformer primary winding 98, and the impedance of either first or second gain control secondary windings 80, 81.

When the current stops increasing, the magnetic flux reverses, determining the frequency of oscillation which changes very little with input voltage. As the magnetic flux collapses when saturation is reached, the voltage induced in first secondary winding 48 of oscillation control transformer 48 has a frequency equal to one divided by the square root of the product of the inductance of first secondary winding 48 and the capacitance of oscillation control capacitor 50, times twice the value of $\pi$. Since this is a forced oscillation produced by the impulse of current in the primary winding 45, the voltage generated in first secondary winding 48 is reduced by the step down turns ration of second secondary winding 47 to first secondary winding 48. Although the voltage wave shape in first secondary winding 48 is substantially a sine wave, the voltage applied to base drive line 62 or 64 from second secondary winding 47 is squared off by the clipping effect of the diode action of the base-emitter junction of first transistor 70 or second transistor 70'. Thus, it is of an essentially constant amplitude during the conduction time and is approximately linear during the "off" time. The duty factor remains constant between the limits of operation determined by the line voltage.

When second transistor 70' is switched "on", a current flows from power input line 41 through the center tap of oscillation control transformer primary winding 45 passing through one-half of winding 45 onto line 68. The current then passes through first section 98 of second inverter transformer primary winding 84 to second transistor tap line 92 and then to second transistor collector 74'. Since second transistor 70' is "on", current flows from collector 70' to emitter 76' which is coupled to second inverter transformer gain control secondary winding 81 and then to ground 30, which completes the current path through transistor element 70'. Collector current drawn by second transistor 70' forces a current to flow through a portion of oscillation control transformer primary winding 45 and induces voltages in oscillation control transformer secondary windings 47 and 48. The induced voltage in oscillation control transformer first secondary winding 48 establishes an oscillation frequency within system 10. Additionally, an induced voltage is generated in second oscillation control transformer secondary winding 47 which has a predetermined phase such that the transistor 70 or 70' which was in the "off" state will be biased such that it turns "on". The transistor 70 or 70' which was in the "on" state is on the opposing end of winding 47 and such transistor will be biased such that it is turned to the "off" condition.

Relative to the example, current may now flow from one end of oscillation control transformer secondary winding 47 through line 62 to base 72 of first transistor 70 turning it to an "on" state. Current for first transistor 70 flows from power input line 41 through the center tap of oscillation control transformer primary winding 45 and through one-half of winding 45 to line 66 coupling it to first section 94 of inverter transformer first primary winding 82. Current then flows through first transistor tap line 90 to collector 74 of first transistor 70. Since transistor 70 is in the "on" state, current flows from collector 74 to emitter 76 and passes through first inverter transformer gain control secondary winding 80 to ground 30.

As has been shown, this process is a repetitive one which causes a continual oscillation as long as power source 12 is coupled to system 10 through switch 14.

As is known from classical transistor theory, the emitter current of a transistor is the combination of the base current and the collector current. In the operation of ballast system 10, the base current component of the emitter current, for example, transistor 70 when it is in an "on" state, flows from ground 30 into blocking diode 58 and then through current limiting resistor 56 and into tap line 60, through half the winding of oscillation control transformer secondary winding 47, and line 62 to base 72. From base 72, current flows through transistor emitter 76 and into inverter transformer gain control secondary winding 80 and then back to ground 30. During the next half cycle, when second transistor 70' is in the "on" state, base current flows from ground 30 through blocking diode 58, current limiting resistor 56, and center tap line 60 to secondary winding 47. Current in winding 47 passes through line 64 to base 72' of second transistor 70' and then through base-emitter junction 72', 76' to second inverter transformer gain control winding 81 and then to ground 30. Thus, as has now been shown, a complete path for the base current is established during each half cycle when the system is in oscillation.

The center tap of oscillation control transformer secondary winding 47 is negative with respect to ground 30, however, such is positive with respect to the emitter voltage of either first or second transistors 70 or 70'. In general, for an oscillatory circuit to function properly, transistors used in prior art systems must be either matched very closely each to the other, or the gains of the transistors adjusted with external components such that they result in a matched gain. Obviously, such methods add to the cost and complexity of such circuits.

Frequency stabilized automatic gain control ballast system 10 provides for a unique method of achieving gain control without the requirement for matching of transistors or the manual adjustment of gains with external components, as is common in the art. Ballast system 10 includes automatic gain control circuitry 17 including a pair 80 and 81 of the multiplicity of secondary windings of inverter transformer 78. Inverter transformer gain control secondary windings 80 and 81 are coupled to emitter elements 76 and 76' of first and second transistors 70 and 70', respectively, as is clearly shown in the FIGURE. As will be shown in following paragraphs, secondary windings 80 and 81 of automatic gain control circuit 17 are wound in a predetermined manner to provide a negative feedback voltage to each of emitter elements 76 and 76' of first and second transistors 70 and 70'. When collector current flows through first section 94 of primary winding 82, an induced voltage is generated in first inverter transformer gain control secondary winding 80 and is phased such that is negatively biases emitter 76 of first transistor 70 with respect to ground 30 to provide a negative feedback for first transistor 70. This referenced feedback voltage is proportional to the current drawn through first section 94 of primary winding 82 which is the collector current of first transistor 70. Similarly, on alternate half cycles, the collector current for second transistor 70' flows through first section 98 of second primary winding 84 which provides negative feedback for second transistor 70'.

Since the collector currents of first and second transistors 70 and 70' are a function of the base current and the gain of the respective transistors, and assuming that the base current of each transistor 70 and 70' is substantially equal, the difference in collector currents is proportional to the gain of each transistor 70 and 70'. By providing negative feedback proportional to the collector current, the gain of each transistor 70 and 70' may be regulated to a predetermined value. Since the negative feedback limits the gain of each transistor to a predetermined value which is less than the minimum gain of the transistor as specified by the manufacturer, the gain of each transistor as seen by the circuit will be substantially identical.

The base current flowing through current limiting resistor 56 and center tap line 60 follows a symmetrical path through each of the transistor circuits and therefore, the current for practical purposes will be substantially identical. The apparent transistor gain will be the same for both transistors 70 and 70', and is automatically controlled by the negative feedback generated in first inverter transformer gain control secondary winding 80 and second inverter transformer gain control secondary winding 81.

The respective polarities of the emitter feedback voltages appearing between first inverter transformer secondary winding 80, or second inverter transformer gain control secondary winding 81 and ground 30, and the base drive voltages appearing between base 72 or 72' and ground 30 are negative, however, their relative magnitudes are such that the base voltage is positive with respect to the emitter feedback voltage during the conduction time of transistors 70 or 70'. During the "off" time, both the base voltage and the emitter feedback voltage are positive with respect to ground potential but the difference in voltage between them is such that the base 72 or 72' is biased negatively by approximately 2.5 volts with respect to its corresponding emitter 76 or 76', which provides for a fast fall time and a short storage time and therefore, a low dissipation in transistors 70 and 70'. As the DC voltage applied through power input line 41 increases with an increase in input AC voltage from power source 12, both the base voltage and the emitter feedback voltage increase in magnitude but their relative difference remains constant and is essentially equal to 0.7 volts for the type of transistor and power output chosen.

Inverter transformer 78 in the embodiment shown and described, is a ferrite core material type transformer having a 0.040 inch gap to add reluctance to the magnetic path of transformer 78 and prevent the magnetic material from going into saturation. Specifically, in an operating system 10, inverter transformer primary windings 82 and 84 have respective first sections 94 and 98 formed by 76.5 turns and respective second sections 96 and 100 formed with 16 turns. Gain control secondary windings 80 and 81 are formed with 3.0 turns each. Heater secondary windings 102, 104 and 106 of inverter transformer 78 may be made up of 2.0 turns each.

As has been previously stated, tapped inverter transformer primary windings 82 and 84 are tapped in a manner to provide an auto-transformer type configuration with first sections 94 and 98 acting as primary windings and second sections 96 and 100 acting as secondary windings in this type of auto-transformer configuration. In this type of configuration, voltage in primary sections 94 and 98 are added respectively to secondary voltages incurred in secondary winding sections 96 and 100.

Referring now to inverter transformer 78, it is seen that current flows through primary section 98 through collector 74' of transistor 70' which for example is in a conducting state. When switching takes place, transistor 70' goes to a non-conducting state which causes a rapid change in current and produces a high voltage in primary section 98 approximating 240.0 volts and in secondary section 100 approximating 80.0 volts, which are added together by virtue of the auto-transformer configuration. This added voltage is then seen at second coupling capacitor 88. In like manner, a high voltage is induced in primary section 94 similar to the voltage value of section 98. Section 96 provides for a voltage similar in value to that for winding section 100, since the windings generated in the auto-transformer configured windings 94 and 96 are added together and applied to gas discharge tube 40 through first coupling capacitor 86.

Voltage induced in first primary winding 82 when first transistor 70 is switched to an "off" state is substantially equal in magnitude, but opposite in polarity, to that induced in winding 82 when second transistor 70' is switched to an "off" state. Thus, it is seen that an alternating voltage is generated at the predetermined frequency established by frequency control circuit 11. In a similar manner, the voltage induced in second primary winding 84 is also alternating at the predetermined frequency and approximately 180° out of phase with the voltage generated in first primary winding 82, since only one transistor 70 or 70' is in an "on" or "off" state at one time interval.

First and second coupling capacitors 86 and 88 are connected to tapped inverter transformer primary windings 82 and 84, respectively, of inverter transformer 78. Capacitors 86 and 88 are also coupled to first filaments 42 and 42' of gas discharge tubes 40 and 40' for discharging the induced voltage signal. Secondary filament heater windings 102 and 106 are coupled in series relation to each of first and second coupling capacitors 86 and 88, respectively, for discharging the sum of the induced voltages in primary sections 94 and 98 and secondary sections 96 and 100 into gas discharge tubes 40 and 40'.

As is clearly seen, secondary filament heater windings 102 and 104 of inverter transformer 78 heat filaments 42 and 44 of gas discharge tube 40. In a similar manner, secondary filament heater windings 104 and 106 of inverter transformer 78 heat filaments 44' and 42' of gas discharge tube 40'.

The induced voltage which is discharged in fluorescent tubes 40 and 40' causes a current to flow from filaments 42 and 42' to filaments 44 and 44', respectively. Both filaments 44 and 44' are coupled to ground 30 through filament lead 108.

Second filaments 44 and 44' of gas discharge tubes 40 and 40' are connected in parallel each to the other through lines 108 and 110.

Secondary filament heater winding 104 is coupled in parallel relation with second filaments 44 and 44' of gas discharge tubes 40 and 40'. Similarly, filament heater secondary windings 102 and 106 are connected in parallel to the first filaments 42 and 42', respectively. Thus, first filaments 42 and 42' are heated by filament heater windings 102 and 106, and second filaments 44 and 44' share heater current from heater filament secondary winding 104, which is coupled to ground 30 to provide a current path for the induced discharge current.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A frequency stabilized, gain controlled ballast system having a power source for actuating at least one gas discharge tube, comprising:
    (a) frequency control means connected to said power source for establishing a substantially constant oscillation signal of predetermined frequency;
    (b) switching means coupled to said frequency control means for establishing a pulsating current responsive to said substantially constant oscillation signal at said predetermined frequency; and,
    (c) induction means coupled to said frequency control means and said switching means for generating a voltage across said gas discharge tube responsive to said pulsating current established by said switching means, said induction means including automatic gain control means for maintaining a gain value of said switching means to a predetermined level.

2. The ballast system as recited in claim 1 where said frequency control means includes an oscillation control transformer having a primary winding and a pair of secondary windings, said primary winding being connected to said power source and said induction means.

3. The ballast system as recited in claim 2 where said frequency control means includes an oscillation control capacitor coupled to a first secondary winding of said oscillation control transformer, said capacitor having a predetermined capacitance value for establishing said predetermined frequency of said oscillation signal.

4. The ballast system as recited in claim 3 where said oscillation control transformer includes a second secondary winding, said second secondary winding having a center tap to said power source and being coupled on opposing ends thereof to said switching means.

5. The ballast system as recited in claim 2 where said oscillation control transformer includes a core of ferrite material composition.

6. The ballast system as recited in claim 5 where said oscillation control transformer is operational in a saturation mode when said gas discharge tubes are actuated.

7. The ballast system as recited in claim 1 where said switching means includes at least a pair of transistors being coupled to said frequency control means and said induction means.

8. The ballast system as recited in claim 7 where said switching means includes a first and second transistor, each of said first and second transistors having a respective base element, a collector element and an emitter element, said emitter element being connected to said automatic gain control means.

9. The ballast system as recited in claim 8 where said frequency control means includes an oscillation control transformer having a primary winding, a first secondary winding and a second secondary winding, said second secondary winding being center tapped to said power source, said first and second transistor base elements being coupled to opposing ends of said second secondary winding.

10. The ballast system as recited in claim 8 where said first and second transistor collector elements are coupled to said induction means.

11. The ballast system as recited in claim 1 where said induction means includes:
    (a) an inverter transformer coupled to said switching means and said frequency control means, said inverter transformer having a tapped pair of primary windings and a multiplicity of secondary windings; and,
    (b) a pair of coupling capacitors, each of said coupling capacitors connected in series relation to one of said respective primary windings and one of said gas discharge tubes.

12. The ballast system as recited in claim 11 where said pair of primary windings of said inverter transformer are tapped in a manner to provide an auto-transformer configuration.

13. The ballast system as recited in claim 11 where one of said pair of said primary windings of said inverter transformer passes a current on alternate half cycles of said predetermined frequency relative to the other of said primary windings of said inverter transformer.

14. The ballast system as recited in claim 11 where said switching means includes a first and second transistor, each of said first and second transistors having a respective base element, a collector element and an emitter element, each of said taps of said primary windings being connected to a respective collector element of each of said first and second transistors.

15. The ballast system as recited in claim 14 where said frequency control means includes an oscillation control transformer having a primary winding and a pair of secondary windings, each of said inverter transformer primary windings being connected to opposite ends of said primary winding of said oscillation control transformer.

16. The ballast system as recited in claim 15 where each of said pair of coupling capacitors have a predetermined capacitive value for discharging said voltage from each of said primary windings of said inverter transformer across a respective one of said gas discharge tubes.

17. The ballast system as recited in claim 14 where said automatic gain control means is comprised of one pair of said multiplicity of secondary windings of said inverter transformer.

18. The ballast system as recited in claim 17 where one of said pair of secondary windings comprising said automatic gain control means is coupled to said emitter element of said first transistor and said other of said secondary windings is coupled to said emitter element of said second transistor.

19. The ballast system as recited in claim 18 where said pair of secondary windings of said automatic gain control means are wound in a predetermined manner to provide a negative feedback voltage to each of said emitter elements of said first and second transistors.

20. The ballast system as recited in claim 11 where said inverter transformer is a ferrite core transformer having a predetermined gap for preventing operation in a saturation mode.

21. The ballast system as recited in claim 11 where at least two of said inverter transformer secondary windings are connected to opposing filaments of at least one of said gas discharge tubes.

22. The ballast system as recited in claim 1 where said power source is an AC power source.

23. The ballast system as recited in claim 22 including rectification means for providing full wave rectification of said power source AC voltage, said rectification means being connected to said AC power source and said frequency control means.

24. The ballast system as recited in claim 23 where said rectification means includes a full wave bridge circuit.

25. The ballast system as recited in claim 23 including filter means for filtering a pulsating DC voltage from said rectification means, said filter means being coupled to said rectification means.

26. The ballast system as recited in claim 25 where said filter means includes:
(a) a choke coupled in series relation to said rectification means; and,
(b) a pair of filter capacitors coupled to opposing ends of said choke.

* * * * *